(12) United States Patent
Poncet

(10) Patent No.: US 8,312,818 B2
(45) Date of Patent: Nov. 20, 2012

(54) MODULAR VIBRATORY FLOOR

(76) Inventor: Jean-Claude Poncet, Sennecey-le-Grand (FR)

( * ) Notice: Subject to any disclaimer, the term of this patent is extended or adjusted under 35 U.S.C. 154(b) by 395 days.

(21) Appl. No.: 12/300,547

(22) PCT Filed: May 12, 2006

(86) PCT No.: PCT/FR2006/001071
§ 371 (c)(1),
(2), (4) Date: Mar. 6, 2009

(87) PCT Pub. No.: WO2007/132072
PCT Pub. Date: Nov. 22, 2007

(65) Prior Publication Data
US 2009/0260539 A1 Oct. 22, 2009

(51) Int. Cl.
*B61D 17/10* (2006.01)
*B60P 1/58* (2006.01)
*B65D 88/66* (2006.01)

(52) U.S. Cl. ............ 105/422; 222/199; 298/1 V; 52/197
(58) Field of Classification Search .................... 52/197; 105/239, 375, 422; 114/72, 73, 121; 193/2 B; 198/533, 609; 222/196, 197–203; 298/1 V; 366/108, 109–115; 406/75; 414/363, 415
See application file for complete search history.

(56) References Cited

U.S. PATENT DOCUMENTS

| | | | | |
|---|---|---|---|---|
| 2,229,037 A * | 1/1941 | Boldman | .................... | 414/525.7 |
| 3,199,664 A * | 8/1965 | Baker | ............................ | 198/763 |
| 3,612,319 A * | 10/1971 | Bodine | .......................... | 414/659 |
| 4,008,669 A * | 2/1977 | Sumrell | ............................ | 410/47 |
| 4,907,721 A * | 3/1990 | Poncet | .............................. | 222/58 |
| 5,143,418 A * | 9/1992 | Fouquet | ...................... | 296/184.1 |
| 5,303,657 A * | 4/1994 | Oda et al. | .................... | 105/206.1 |
| 5,711,327 A * | 1/1998 | Fields | ............................ | 134/105 |
| 6,027,120 A * | 2/2000 | Wojcinski et al. | ............ | 273/404 |
| 6,558,111 B2 * | 5/2003 | Wilson et al. | .................. | 414/810 |
| 7,735,426 B2 * | 6/2010 | Creighton et al. | ............ | 105/286 |
| 2004/0173119 A1 * | 9/2004 | Norton et al. | .................. | 105/355 |

FOREIGN PATENT DOCUMENTS

FR 2641565 A2 * 7/1990
WO WO 8801963 A1 * 3/1988

* cited by examiner

*Primary Examiner* — S. Joseph Morano
*Assistant Examiner* — Zachary Kuhfuss
(74) *Attorney, Agent, or Firm* — James E. Walton; Richard G. Eldredge

(57) ABSTRACT

The invention relates to a vibratory floor consisting of independent vibratory modules that can be pre-fabricated and are strictly controlled before being put into place in structures for storage or transport of bulk products. Each vibratory module consists of a frame (14) in which a support material (12) is arranged, on which a metal sheet (9) is mounted, said metal sheet being attached to a vibratory element (10) and a stiffener (19) and held in place only by a peripheral sealing membrane (11), optionally supported by compression springs (13). The filling material can comprise ribs (30) for deforming the metal sheet in the form of transversal waves (31) under the effect of the weight of the stored product. The vibratory modules constructed in this way are dust-tight, do no transmit vibrations to the surrounding structure, and effectively drain any lumpy or powdery product from silos, ships, railroad cars, or other containers.

14 Claims, 5 Drawing Sheets

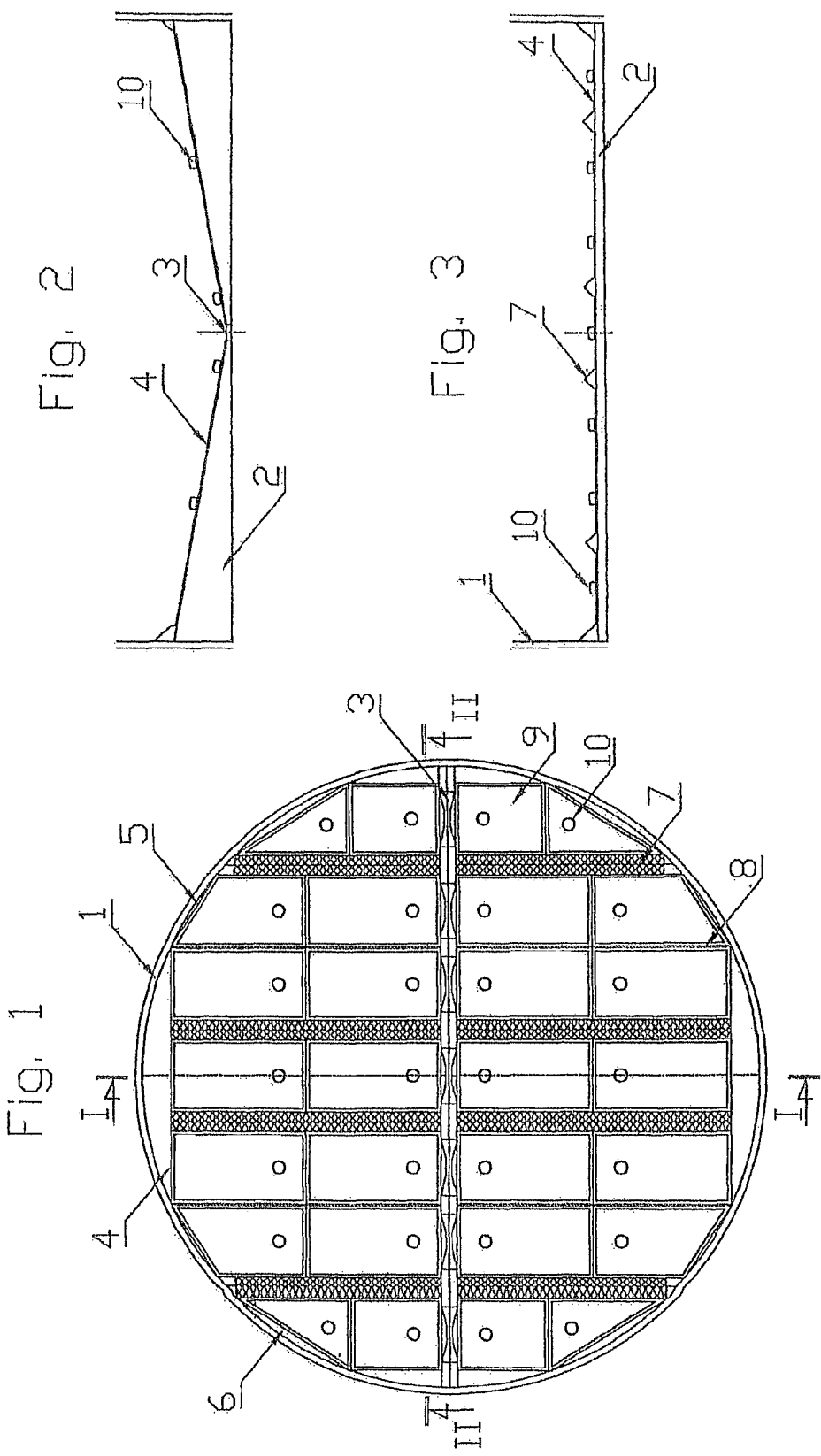

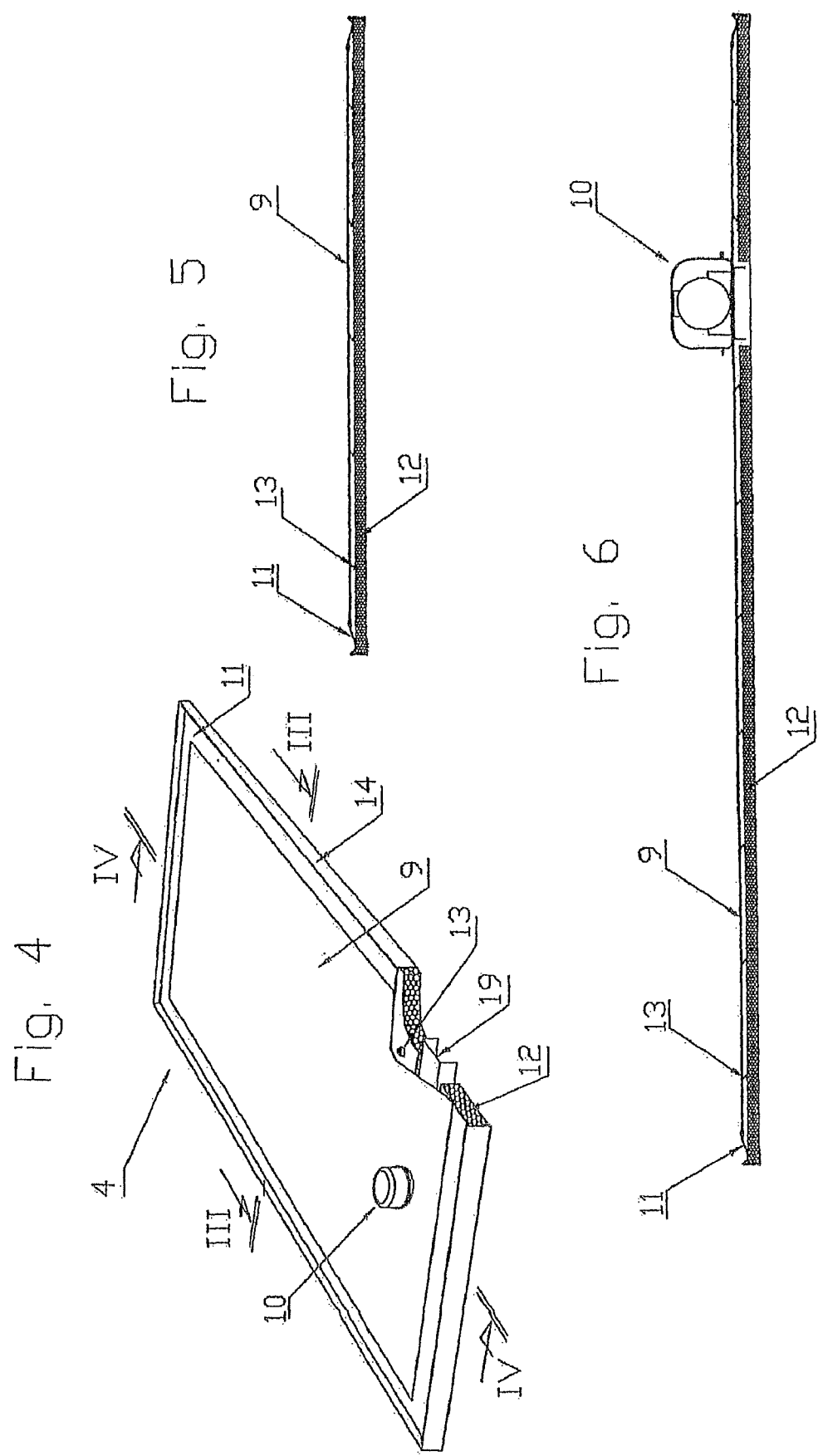

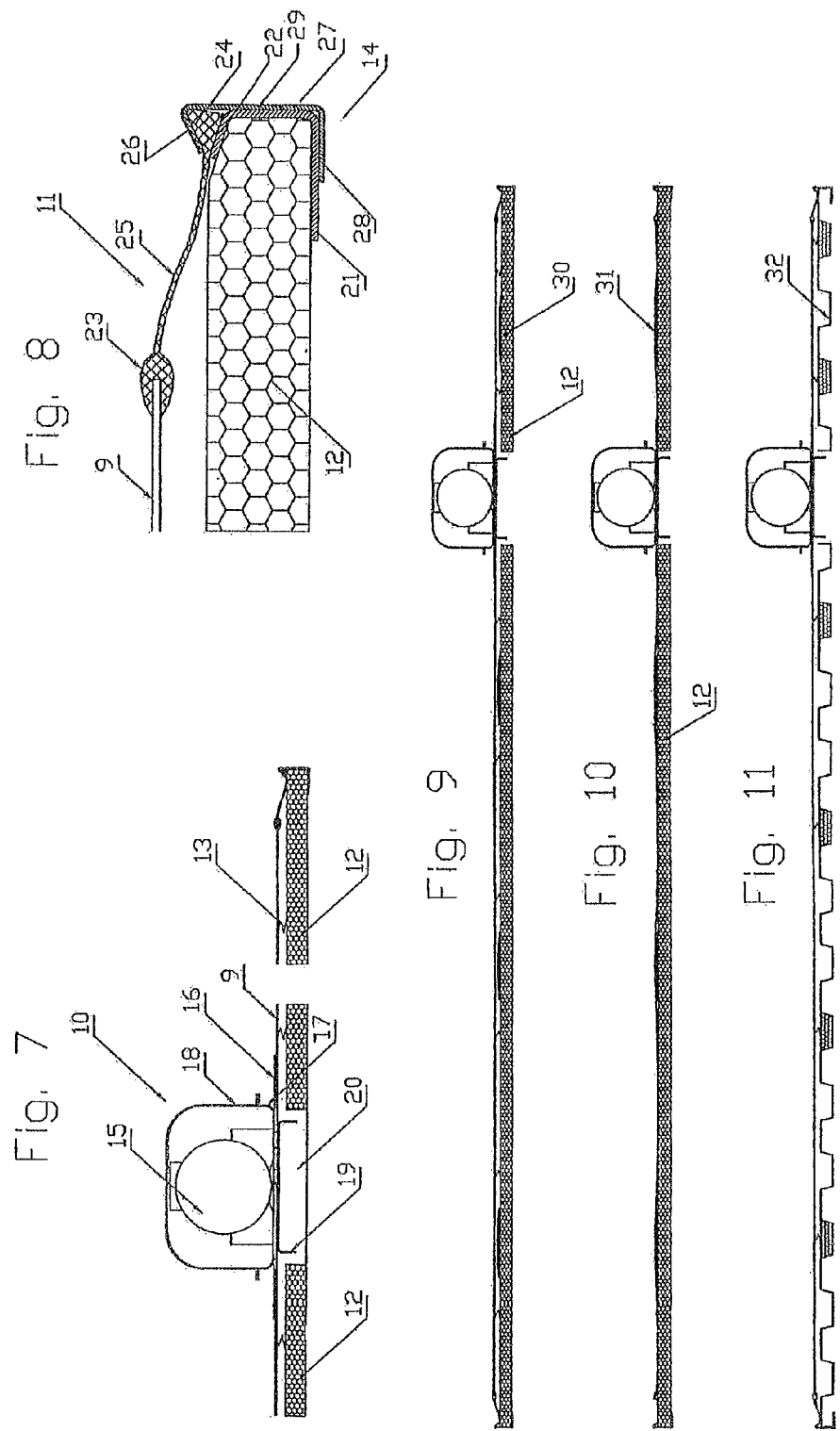

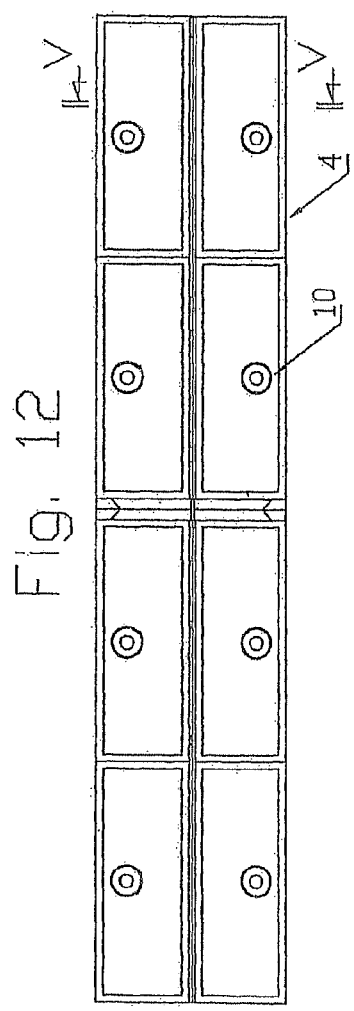
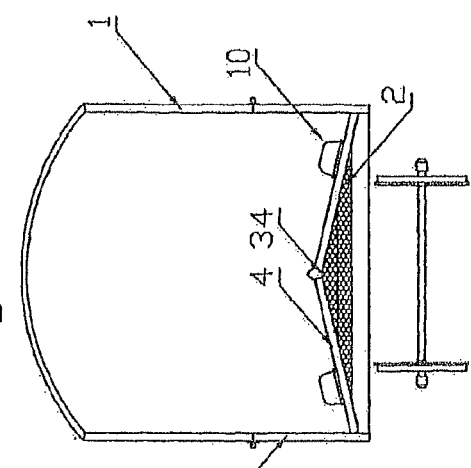
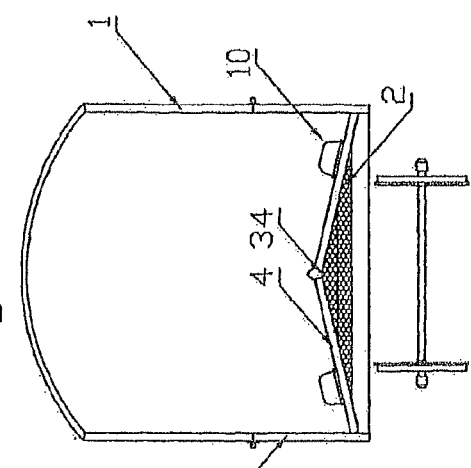
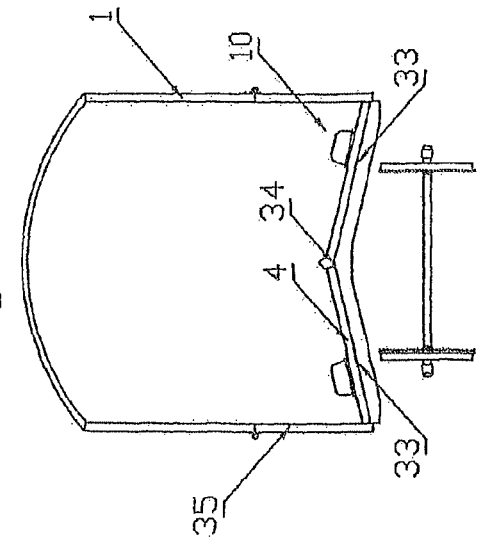

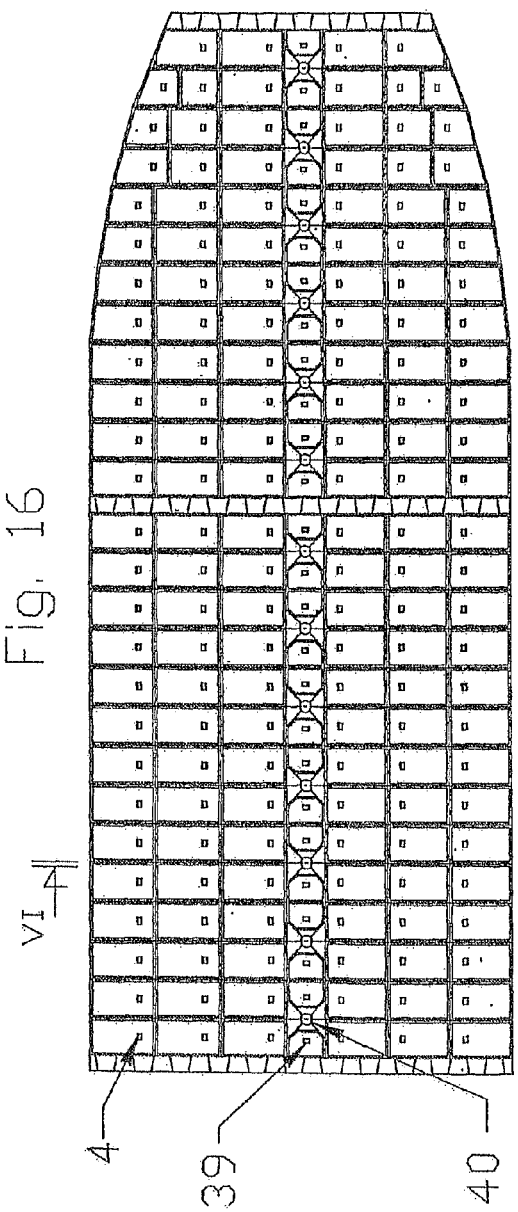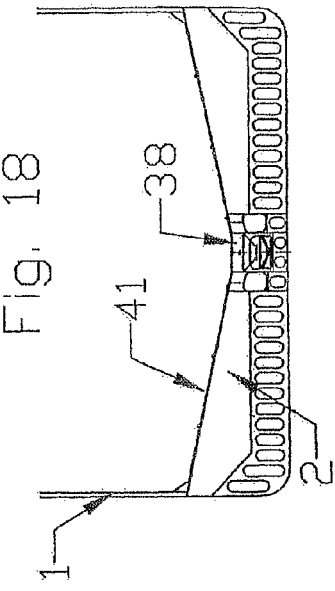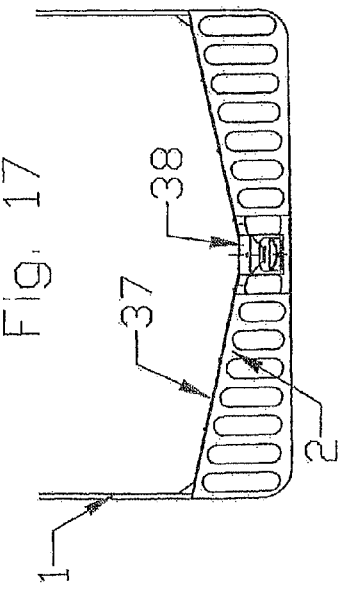

MODULAR VIBRATORY FLOOR

The present invention relates to a universal system for emptying lumpy and powdery products by a modular vibratory floor.

The technique of the vibratory floor used for emptying residual heaps in silos and ships consists in vibratory metal sheets supported on springs, joined end-to-end in order to form crossbars, installed on slopes tilted towards recovery apertures. Each crossbar is held in place by anchorings placed in the high portion of the upper sheet. The seal of the system is ensured by a membrane, an end of which is attached to the periphery of each crossbar, and the other end is held to the ground by metal rabbets. Each vibratory sheet is transversely stiffened by a stiffener attached under the metal sheet, and housed in a blockout provided for this purpose in the slope. This technique has serious application and operational drawbacks. Indeed, as the vibratory metal sheets are firmly attached end-to-end in order to form crossbars, the installation should mandatorily be carried out in situ, causing long periods of immobilization of the silos and of ships preventing their utilization. The in situ installation is carried out at ground level, under very hard working conditions, thereby creating difficulties in quality control of the assembly. On the other hand, each spring requires that a hole be pierced in the slope concrete, which entails a considerable number of piercing operations. Further, the presence of the stiffeners forces provision of blackouts during the building of the slopes, most often achieved by concreting, which blackouts complicate the application of the concreting, and which may not coincide with the final position of the stiffeners. Further, taking into account the unavoidable flatness defects of the foundations on which the vibratory floors are installed, it is very difficult to guarantee a sufficient seal in order to prevent any penetration of dust under the metal sheet, capable of perturbing the operation of the system. Moreover, setting the vibratory metal sheets in direct contact with the foundation may create a cold wall phenomenon between the metal sheets and the layer of product in contact with them, and generate humidity able to degrade the stored product and accelerate corrosion of the metal sheets. As for the anchorings set into place in the upper portion of the crossbars for preventing them from sliding, they form connections between the vibratory portions and the supporting slope, connections capable of transmitting vibrations to the whole of the structure and causing disturbances therein. Further these are wearing parts requiring maintenance, and preferential points for dust penetrations. Finally, the use of flat metal sheets gives rise to the appearance of parasitic transverse vibratory modes, not very favorable to the sought-after flow of the product to be emptied.

The present invention relates to a vibratory floor which overcomes the disadvantages of prior solutions, notably by allowing vibratory floors to be prefabricated as independent vibratory modules, pre-assembled on frames. Consequently, it is no longer necessary to provide blackouts in the slopes, the stiffeners finding place inside the frames.

According to a particular feature of the invention, the metal sheet of each vibratory module is only held in place by its peripheral sealing membrane, which suppresses the requirement of anchorings, and eliminates any transmission of vibrations to the surrounding structure.

In a preferred embodiment of the invention, which per se is not exclusive of the latter, the sealing membrane has on one side a grooved shape which will adhere onto the edge of the metal sheet, and on the other side a bulge which is maintained on the edge of the frame by metal rabbets.

According to another feature of the invention, a supporting material which may be a heat insulator is incorporated into the frames, thereby reducing the cold wall phenomenon between the metal sheet and the stored product, and easily allowing the springs to be set into place and held.

According to another complementary feature of the invention, the supporting material has ribs or embossments in the upper portion, on which the metal sheet will deform by stamping under the load of the stored product, in order to form transverse waves.

Other features of a modular vibratory floor, established according to the invention, will again appear through the following description of exemplary embodiments, given as an indication and by no means as a limitation, with reference to the appended drawings wherein:

FIG. 1 is a schematic plane view of the relevant modular vibratory floor

FIG. 2 is a transverse sectional view along the line I-I of FIG. 1

FIG. 3 is a longitudinal sectional view along the line II-II of FIG. 1

FIG. 4 is a perspective view of a vibratory module

FIG. 5 is a transverse sectional view along the line III-III of FIG. 4 of the unloaded vibratory module FIG. 6 is a longitudinal sectional view, along the line IV-IV of FIG. 4 of the unloaded vibratory module FIG. 7 is a view at a larger scale illustrating various details of FIG. 6

FIG. 8 is a view at a larger scale illustrating various details of FIG. 7

FIG. 9 is another longitudinal sectional view along the line IV-IV of FIG. 4 of the unloaded vibratory module FIG. 10 is a longitudinal sectional view along the line IV-IV of FIG. 4 of the loaded vibratory module FIG. 11 is further another longitudinal sectional view along the line IV-IV of FIG. 4 of the unloaded vibratory module FIG. 12 is a plane view of a modular vibratory floor in a railroad car FIG. 13 is a transverse sectional view along the line V-V of FIG. 12

FIG. 14 is another transverse sectional view along the line V-V of FIG. 12

FIG. 15 is further another transverse sectional view along the line V-V of FIG. 12

FIG. 16 is a plane view of a modular vibratory floor in a self-cleaning ship FIG. 17 is a transverse sectional view along the line VI-VI of FIG. 16 of a new ship FIG. 18 is a transverse sectional view along the line VI-VI of FIG. 16 of a transformed ship.

In the exemplary embodiment illustrated in FIG. 1, the storage structure includes a wall 1 and slopes 2, made on either side of a discharge channel 3. Vibratory modules 4 with a rectangular shape, modules 5 with a trapezoidal shape or modules 6 of a triangular shape, rest on the slopes transversely.

Advantageously, ventilation ducts 7, required for ventilation of certain stored products, may be interposed between the vibratory modules. Alternatively, a cable path 8 may be positioned between the modules, or the latter may be directly juxtaposed.

As this is seen in FIG. 4 from a perspective view, and in the sections of FIGS. 5 and 6, a vibratory module includes a metal sheet 9, a vibratory member 10, a sealing membrane 11, a supporting material 12, compression springs 13, preassembled on a frame 14, and this regardless of the shape of the module.

Referring more particularly to the detail of FIG. 7, it is seen that on the metal sheet 9, the vibratory member 10 includes a vibrator 15 of the electric or other type, resting on a counter-plate 16, a supporting plate 17 with an edge on which a hood 18 is attached by bolting or any other similar means. A stiffener 19 positioned transversely under the metal sheet 9 in a space 20 made in the supporting material, is bolted to the vibrator 15 through the metal sheet 9, the counter-plate 16 and the supporting plate 17. Alternatively, the vibrator 15 may be positioned underneath the metal sheet 9, in which case bolting hems in the vibrator 15, the stiffener 19, the metal sheet 9, and the counter-plate 16.

According to the invention, the frame 14 consists of corner irons 21, the vertical wing of which has in the upper portion a tilted portion 22, assembled at their ends by welding or any other means, on the horizontal wing of which the supporting material 12 rests, itself consisting of a lightweight material of the type: extruded polystyrene, polyurethane foam, aluminum foam, honeycomb plastic or other structure, openworked wood or any other material, capable of withstanding compression forces induced by the stored product without being deformed.

According to another feature of the invention, the profile of the sealing membrane 11 illustrated at a larger scale on the detail of FIG. 8, includes at one end, a grooved shape 23 continuously fitted onto the edge of the metal sheet 9 and held there by bonding, welding, vulcanization, screwing, riveting, or any other means. The profile of the membrane 11 has at its other end a bulge 24, and a flexible portion 25 between the grooved portion 23 and the bulge 24. The portions 23, 24 and 25 of the profile of the membrane 11 may be made in the same material by molding, casting, extruding or welding, or in different materials bonded or welded together or obtained by bi-extrusion or multi-extrusion.

In a preferred embodiment of the invention, but which per se is not exclusive of the latter, the triangular shaped bulge 24 is held in place by jamming it between the tilted portion 22 of the corner iron 21 and the other portion 26 forming a reflex angle of a metal rabbet 27 having a lower horizontal wing 28 surrounding the horizontal wing of the corner iron 21 of the frame 14. The vertical portion 29 of the rabbet 27 is attached onto the vertical portion of the corner iron 21 by screwing, riveting or any other means.

As shown in FIG. 9, the supporting material 12 may include on its upper face and at predetermined intervals transverse ribs 30 with a slightly convex section, so that after the first fillings of the storage unit and under the weight of the stored product, the metal sheet 9 is deformed on the ribs 30 so as to exhibit transverse waves 31 as shown in FIG. 10, waves capable of suppressing transverse parasitic vibratory modes.

According to another embodiment of the invention illustrated in FIG. 11, the supporting material 12 may be a ribbed metal sheet or a ribbed plastic sheet, of the type: siding, collaborating formwork, either coated or not, having round or prismatic transverse waves 32.

In another exemplary embodiment illustrated in FIGS. 12, 13, 14 and 15, the walls 1 are those of a railroad car intended for transporting bulk products, the slopes 2 consisting of 2 tilted faces 33, the crest 34 of which is found in the longitudinal axis of the car, the tilted faces 33 being formed upon building the car. The modules 4 are positioned on the tilted faces 33 and starting the vibratory units 10 causes discharge of the contents towards side doors 35. Alternatively, in order to add vibratory modules 4 in an existing car, the slopes 2 may be made in metal framework 36 or in the supporting materials mentioned earlier.

In still another exemplary embodiment illustrated in FIGS. 16 and 17, the walls 1 are those of a self-cleaning ship for transporting bulk products, the slopes 2 being formed by tilted ballast faces 37, integrated during building of the ship, on which transverse modules 4 rest. Secondary faces 38 support longitudinal modules 39, with which the number of discharge apertures 40 may be reduced.

In the example of transformation of an existing ship illustrated in FIG. 18, the slopes 2 consist of a double bottom 41 added to the structure of the ship.

It is obvious that preassembled vibratory modules on a frame may find place in any structure containing bulk products, whether these are ships, storage silos of any kinds, open sky storage areas, trucks, kips, containers or hoppers, without departing from the scope of the present invention. An efficient automatic emptying system which does not transmit any vibration to the actual structure, does not include any wearing part and contributes to maintaining the quality of the stored products, is thereby introduced into these structures, thereby considerably reducing the assembly and immobilization time.

The invention claimed is:

1. A modular vibratory floor for a walled storage structure supported on tilted faces, comprising:
one or more vibratory modules (4), wherein each module (4) forms a preassembled independent unit, each preassembled independent unit having an independent frame (14) individually filled out with a supporting material (12) on which a flat metal sheet (9) rests, said flat metal sheet being attached on a top surface to a vibratory member (10) and on a bottom surface to a horizontal linear transverse stiffener (19), the stiffener (19) being housed inside an empty space (20) made in the supporting material (12), the stiffener being placed inside the frame.

2. The modular vibratory floor according to claim 1, wherein the supporting material is a metal or plastic siding sheet with transverse, round, omega-shaped or prismatic waves.

3. The modular vibratory floor according to claim 1, wherein the supporting material is a heat insulator consisting of material lightened by inclusion of air or gas.

4. The modular vibratory floor according to claim 1, wherein the supporting material is a plastic material compound with a cellular structure of the honeycomb type.

5. The modular vibratory floor according to claim 1, wherein the supporting material is an assembly of plastic profiles.

6. The modular vibratory floor according to claim 1, wherein the supporting material is a ligneous fiber composite.

7. The modular vibratory floor according to claim 1, wherein compression springs are interposed between the metal sheet and the supporting material and attached in the supporting material.

8. The modular vibratory floor according to claim 1, wherein the outer walls are those of a ship, the tilted faces being the ballast floor of the ship.

9. The modular vibratory floor according to claim 8, wherein the tilted faces form a double bottom added to the structure of the ship.

10. The modular vibratory floor according to claim 1, wherein longitudinal modules allow the number of discharge apertures to be reduced.

11. A modular vibratory floor for a walled storage structure supported on tilted faces, comprising:
one or more vibratory modules, wherein each of the one or more vibratory modules form a preassembled independent unit on a frame, filled out with a supporting material on which a metal sheet attached to a vibratory member and to a transverse stiffener rests, the stiffener being housed inside an empty space made in the supporting material, the stiffener being placed inside the frame, wherein the supporting material includes in an upper portion transverse ribs with a predefined gap, on which transverse waves are formed in the metal sheet by deformation of the metal sheet under the weight of the stored product during the first loading operations.

12. The modular vibratory floor according to claim 11, wherein the outer walls are those of a railroad car, the tilted faces joining together at their top along the longitudinal axis of the car.

13. A modular vibratory floor for a walled storage structure supported on tilted faces, comprising:
one or more vibratory modules (4), wherein each module (4) forms a preassembled independent unit, each preassembled independent unit having an independent frame (14) individually filled out with a supporting material (12) on which a flat metal sheet (9) rests, said flat metal sheet being attached on a top surface to a vibratory member (10) and on a bottom surface to a horizontal linear transverse stiffener (19), the flat metal sheet (9) being held in place on the frame (14) only by a connection with a flexible peripheral sealing membrane (11) attached on the perimeter of the frame, and only by bearing upon the compression springs (13).

14. A modular vibratory floor for a walled storage structure supported on tilted faces, comprising:
one or more vibratory modules, wherein each of the one or more vibratory modules form a preassembled independent unit on a frame, filled out with a supporting material on which a metal sheet attached to a vibratory member and to a transverse stiffener rests, the stiffener being housed inside an empty space made in the supporting material, the stiffener being placed inside the frame, wherein the metal sheet is held in place on the frame only by a connection with a flexible peripheral sealing membrane attached on the perimeter of the frame, and only by bearing upon compression springs, the metal sheets of different modules further not having any connection between them and, wherein the profile of the sealing membrane has at one end, a grooved shape fitted and adhered onto the perimeter of the metal sheet and at the other end, a bulge held by rabbets and the corner irons of the frame.

* * * * *